United States Patent [19]

Nille

[11] Patent Number: 4,755,205
[45] Date of Patent: Jul. 5, 1988

[54] SOIL-ACTIVATING AGENT AND ITS APPLICATION

[75] Inventor: Bernd Nille, Wolfenbüttel, Fed. Rep. of Germany

[73] Assignee: Gebr. Friedrich GmbH & Co. Bauservice KG, Salzgitter, Fed. Rep. of Germany

[21] Appl. No.: 831,299

[22] Filed: Feb. 20, 1986

[30] Foreign Application Priority Data

Jun. 12, 1985 [EP] European Pat. Off. ........ 85107225.6

[51] Int. Cl.$^4$ .............................................. C05F 11/08
[52] U.S. Cl. ............................................ 71/6; 71/903
[58] Field of Search ............................ 71/5, 6, 7, 903

[56] References Cited

U.S. PATENT DOCUMENTS 3,714,063 1/1973 Salamore ................................ 71/6 X
4,539,036 9/1985 Naschberger ...................... 71/903 X

FOREIGN PATENT DOCUMENTS 0121493 2/1984 European Pat. Off. .
3115016 3/1983 Fed. Rep. of Germany .

Primary Examiner—Ferris H. Lander
Attorney, Agent, or Firm—Shlesinger, Arkwright & Garvey

[57] ABSTRACT

A soil-activating agent for extreme soils, for instance soils with very little organic substances or none at all and/or high contents of salts and/or heavy metals, is characterized by the combination of a fungal mycelium biomass and the tertiary system nitrogen-base/sugar-type/phosphoric-acid. This agent is characterized by an especially rapid and dense greening of extreme soils, in particular those with very little or no organic substances, and in that additional content of deleterious materials can be tolerated.

16 Claims, No Drawings

SOIL-ACTIVATING AGENT AND ITS APPLICATION

The invention concerns a soil-activating agent for extreme soils, for instance soils with very little or no organic substance and/or high contents of salts or heavy metals. The invention furthermore concerns the particular application of these soil-activating agents to various types of soils.

The intensive mechanization during the past decades that took place in the industrial countries also resulted in increasing problems in agriculture as well as in the field of large excavations such as gravel and sand pits, in particular however soft-coal surfaces pits and railroad structures. The results were embankments, dams, dumping grounds and stock piles, which due to their exposures are susceptible to slippage, erosion and dust formation.

To protect these areas against further water and wind erosions, and to make them more sightly, it has been attempted to recultivate them, that is, to green them. However, in many instances such soils lack the properties necessary for recultivation. Depending on the kind and origin of the soil, there is a lack of humus, nutrients etc. Conditions are even more adverse when the soil contains growth-inhibiting or hampering deleterious substances and/or evinces extreme pH values. The latter characteristics are found especially in slag and ash soils.

To make greening possible nevertheless, such areas frequently are covered with a high-grade humus top layer. However, the digging up, shipping and depositing of such topsoils are exceedingly costly, the more so that in most cases additional steps are necessary, in particular initial stabilization. Moreover, such layers cannot be deposited on and anchored in steep embankments or slopes.

Aside from such solutions, these displacements of high-grade soils are ecologically undesirable because the increasing demand no longer can be met alone from the land used up in construction. Thus the humus soil would have to be taken from where it is already used for planting.

Accordingly, and already for a long time a plurality of fertilizer and soil-improving agents have been developed whereby it was attempted to supply the above mentioned problem soils with substances supporting seed germination and plant growth and also the formation and humus necessary for such processes and which would counteract the effects of deleterious substances possibly presented. The results so far achieved however have been satisfactory only where fairly favorable conditions awaited the use of the particular agents. Difficulties still are being encountered with those soils which the problems are compounded, illustratively those practically without organic substances or loaded with deleterious materials or evincing extreme pH values. More than the above-mentioned slag and ash soils are concerned here. It was found in more recent times that the soil in areas suffering from dieing forests is strongly contaminated with heavy metals and salts, and more over its pH values as a rule are far below the levels required for the growth of the particular type of tree.

Several of the known soil activating agents are illustratively described below among the plurality of their kind.

A fertilizer has been known for several years which consists mainly of a biomass of the penicillium chrysogenum mycelium fungus. This biomass is a waste product from the penicillin production. It enhances germination and growth of plants and therefore supports cultivation even where the soil contains little or no organic material.

However this agent is inadequate for heavily erosive conditions to achieve enough soil stabilization for seen germination. Therefore the European patent document A No. 0 121 493 proposes to combine the fungal mycelium biomass with a soil strengthener already known for some time and based on polybutadiene. The results are satisfactory also where a soil poor in organics is exposed to high erosion. Yet the agent fails where further problems intervene, for instance in ash and slag soils and also in forest soils contaminated with deleterious materials. Manifestly the salts and heavy metals negate the otherwise present biomass effect, so that no soil improvement takes place. Rather the biomass decays, whereby recultivation of such soils with little or no organics cannot be carried out with that agent.

Another soil activating agent is described in the German Offenlegungsschrift No. 31 15 016. It is characterized by a nitrogen-based substance, in particular urea sugar-type phosphoric acid. The document states that this agent acts in production-enhancing manner even in the presence of deleterious materials in the soil, namely it should reduce their toxicity.

However, the results were not particularly impressive as regards extreme soils. For soils with low contents in organics, relatively high amounts of this agent must be applied to achieve a modicum of greening. The results is high costs, Also the stabilization of the soils treated with this agent needs improving.

Therefore it is the object of the invention to find an agent making possible a partiuclarly rapid and dense greening of extreme soils, especially those with very low organics or none and with additional contents of deleterious materials.

This problem is solved by the invention by combining the above described biomass of the mycelium fungus with the also above-described tertiary system of nitrogen-base/sugar-type/phosphoric acid.

Initial tests with this combination of agents have clearly shown that even in sterile soils simultaneously containing deleterious materials plant growth took place from the seen after a few days and developed to an extent not kown heretofore with respect to this type of soil and when compared with previously known agents. Most surprising was the rapidity of the growth and the relatively profuse root production whereby, as an additional effect, already within a short time the soil was effectively stabilized. Therefore the combination of agents of the invention is especially well suited to green steep slopes and embankments. In locations which are more sheltered against wind and water erosion, especially as regards plane soils lacking looseness, it is not necessary to add then a soil stabilizer, furthermore the soil stabilizer is required only to the extent that the seeds shall not be initially displaced. Germination and root formation then within a short time assure adequate stabilization needing no further assistance.

The combination of these agents known per se can only be construed in the light of the effects achieved as being a lucky draw from a selection among the many already present fertilizer and soil-activating agents. In any event numerous tests with other agents failed to achieve even an approximate plant growth in comparable soils to what is achieved by means of the combination of agents of the invention. The two agents complement one another synergistically, with growth of plant and of roots being achieved that cannot be explained by sheer addition of the two agents. Even in soils lacking any organics there manifestly takes place an intensive production of biomass forming extremely rapidly a base for seed germination and plant growth. Because of the prior negative experience with the use of the mycelium fungus biomass, it could not have been expected that effects on the biomass due to the deleterious materials would now and manifestly be absent when the combination of the agents of the invention is employed and where the growth-furthering effect of the biomass is even substantially increased. To that extent this agent is significant not only for problem soils, but it also acts in growth-enhancing manner, in particular as a growth-accelerating means also in those soils of which the greening presents no large difficulties. This is especially valuable where it is desired to establish lawns or to stabilize slopes or embankments rapidly.

Another field of application of the combination of agents of the invention is the forest floor in areas threatened with forest extinction. There growth has come to stop wholly on account of contamination by salts and heavy metals, in most cases yet in combination with extremely low pH values. The effects of the deleterious materials on tree growth can be limited or even eliminated when using the combination of agents of the invention. Additionally the formation of mycorrhiza fungus and the soil life is so energized that as a result an optimal soil is again available for tree growth. To the extent that the pH value of this soil substantially deviates from the particular pH value favorable to the particular kind of tree, a known pH-shifting means may be added for compensation.

If addition of a soil stabilizer is required, it should be selected from the polymer-based ones, in particular those based on polybutadiene.

Potassium magnesium sulfate should be added to the mycelium biomass. Appropriately the biomass is at least 70% organic.

As regards the tertiary system nitrogen-base/sugar-type/phosphoric-acid, a ratio of about 40/20/40 was found particularly effective.

Advantageously silicates and/or silica will be added to the combination of agents.

The ratio of the biomass to the system of substances should be between 2.5/1 and 1/1 with the biomass tending to be high for soils without any organics and/or with extremely low nutrients, whereas a high portion of the tertiary system is desired most of all in soils loaded with deleterious materials and/or for soils with extremely high or low pH values.

Appropriately the individual components of the combination of agents are present in spray form whereby the product quite easily can be spread over large areas. Obviously some or all ingredients can also be present in granular form and spread that way, so that in some cases the combination of agents of the invention only comes into being when in the soil. What matters is that in such an event the distribution should be simultaneous.

To support formation of humus, peat also should be added, preferably in liquid form.

Depending on the kind of soil receiving the soil activating agents of the invention, the amounts applied will vary. As regards sterile, sandy soils, the following quantities are recommended:
Biomass: 150 to 250 g/m$^2$
Tertiary system: 100 to 140 g/m$^2$
Soil stabilizer: 10 to 30 g/m$^2$ For ash soils, the following quantities are recommended:
Biomass: 200 to 300 g/m$^2$ approx.
Tertiary system: 140 to 180 g/m$^2$ approx.

For slag soils with high contents of heavy metals, the following quantities are recommended:
Biomass: 150 to 250 g/m$^2$ approx.
Tertiary system: 140 to 180 g/m$^2$ For soil with extremely low pH values, the following composition is suitable:
Biomass: approx. 200 to 300 g/m$^2$
Tertiary system: 100 to 180 g/m$^2$
CaCO$_3$: up to 50 tons/hectare.

When erosion is present, 20 g/m$^2$ of soil stabilizer should be added further. If the grass seeds must be spread, simultaneously, about 10 to 30 g/m$^2$ of grass seeds should be added to the liquid. The addition of 200 g/m$^2$ of peat to all of the above types of soil is recommended.

I claim:

1. A soil-activating agent for application to extreme soils which are characterized as being sufficiently depleted of organic matter, sufficiently overburdened with salt, sufficiently overburdened with heavy metals or combinations thereof so as to inhibit greening of said soils, wherein the soil-activating agent is comprised of a fungal mycelium biomass in combination with a tertiary chemical system comprised of nitrogen base, sugar and phosphoric acid wherein the nitrogen base to sugar to phosphoric acid ratio of said tertiary chemical system is about 40:20:40, the ratio of said biomass to said tertiary chemical system being from about 2.5:1 to about 1:1.

2. A soil-activating agent as in claim 1, wherein said soil-activating agent further includes a polymer-based soil stabilizer.

3. A soil-activating agent as in claim 2, wherein said soil stabilizer is polybutadiene.

4. A soil-activating agent as in claim 1, wherein said biomass further include potassium magnesium sulfate.

5. A soil-activating agent as in claim 1, wherein said biomass is comprised of at least 70 percent of organic matter.

6. A soil-activating agent as in claim 1, wherein said soil-activating agent further includes silicates, silica or combination thereof.

7. A soil-activating agent as in claim 1, wherein the individual constituents of said soil-activating agent are present in liquid form.

8. A soil-activating agent as in claim 1, wherein said soil-activating agent further includes peat.

9. A soil-activating agent as in claim 8, wherein said peat is in liquid form.

10. A soil-activating agent as in claim 2, said soil-activating agent for application to sterile, sandy soil, wherein for each meter$^2$ of soil to be treated, said soil-activating agent comprises 150 to 250 grams of said biomass, 100 to 140 grams of said tertiary chemical system and 10 to 30 grams of said soil stabilizer.

11. A soil-activating agent as in claim 1, said soil-activating agent for application to ash soil characterized as being sufficiently overburdened with salt, sufficiently overburdened with heavy metals or a combination thereof so as to inhibit greening of said ash soil, wherein for each meter$^2$ of soil to be treated, said soil-activating agent comprises between about 200 to 300 grams of said biomass and between about 140 to 180 grams of said tertiary chemical system.

12. A soil-activating agent as in claim 1, said soil-activating agent for application to slag soil characterized as being sufficiently overburdened with salt, sufficiently overburdened with heavy metals or a combination thereof so as to inhibit greening of said slag soil, wherein for each meter$^2$ of soil to be treated, said soil-activating agent comprises between about 150 to 250 grams of said biomass and between about 140 to 180 grams of said tertiary chemical system.

13. A soil-activating agent as in claim 1, said soil-activating agent for application to soil characterized as having a sufficiently low pH value so as to inhibit greening thereof, wherein for each meter$^2$ of soil to be treated, said soil-activating agent comprises between about 200 to 300 grams of said biomass, between about 100 to 180 grams of said tertiary chemical system and up to about 4,536 grams of lime.

14. A soil-activating agent as in claim 11, wherein for each meter$^2$ of soil to be treated, said soil-activating agent further includes 20 grams of soil stabilizer.

15. A soil-activating agent as in claim 10, wherein for each meter$^2$ of soil to be treated, said soil-activating agent further includes about 200 grams of peat.

16. A soil-activating agent as in claim 10, wherein for each meter$^2$ of soil to be treated, said soil-activating agent further includes 10 to 30 grams of grass seed.

* * * * *